United States Patent Office 2,780,458
Patented Feb. 5, 1957

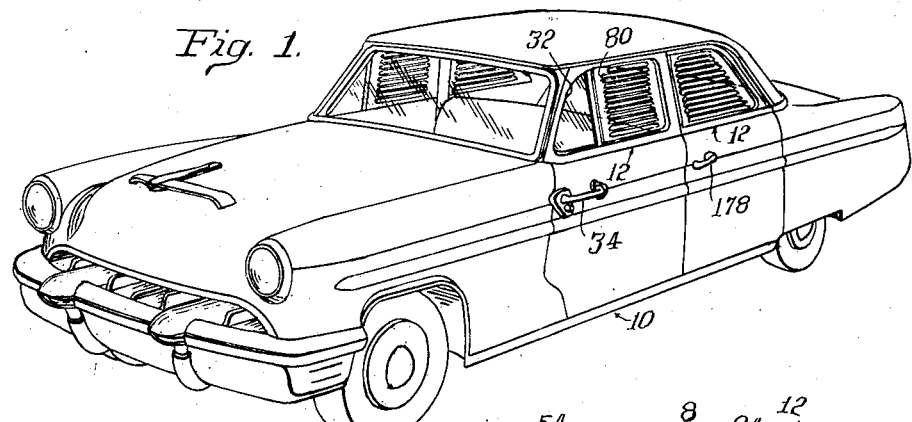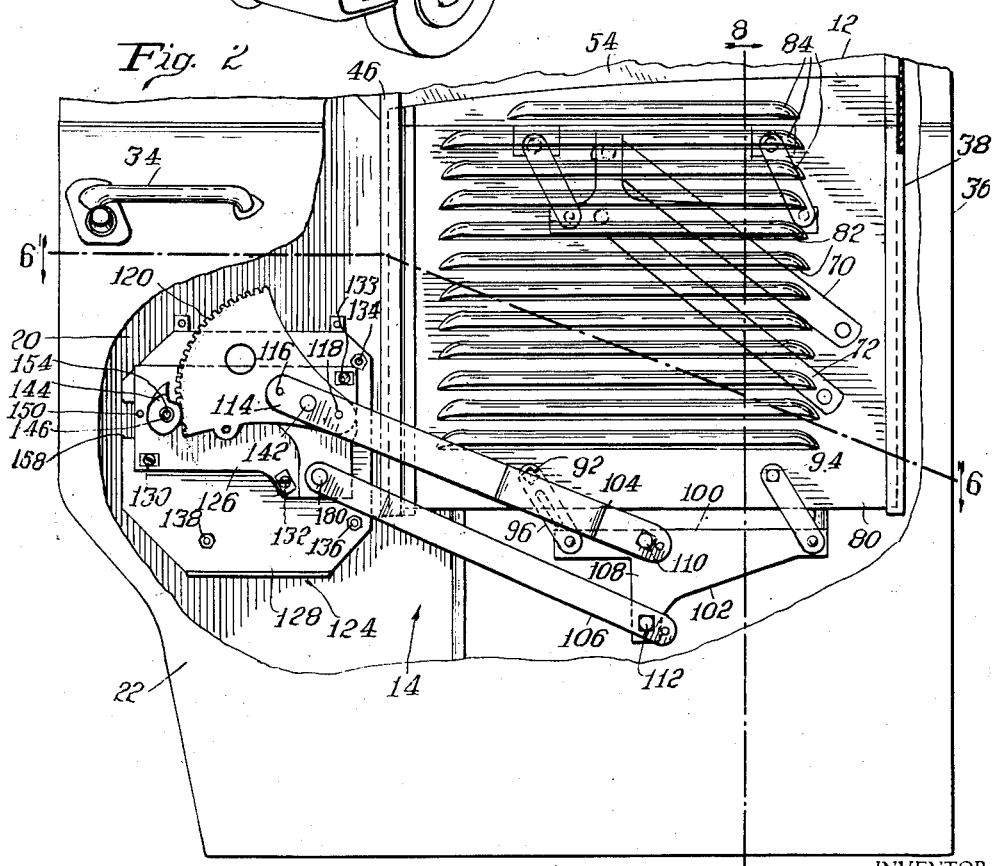

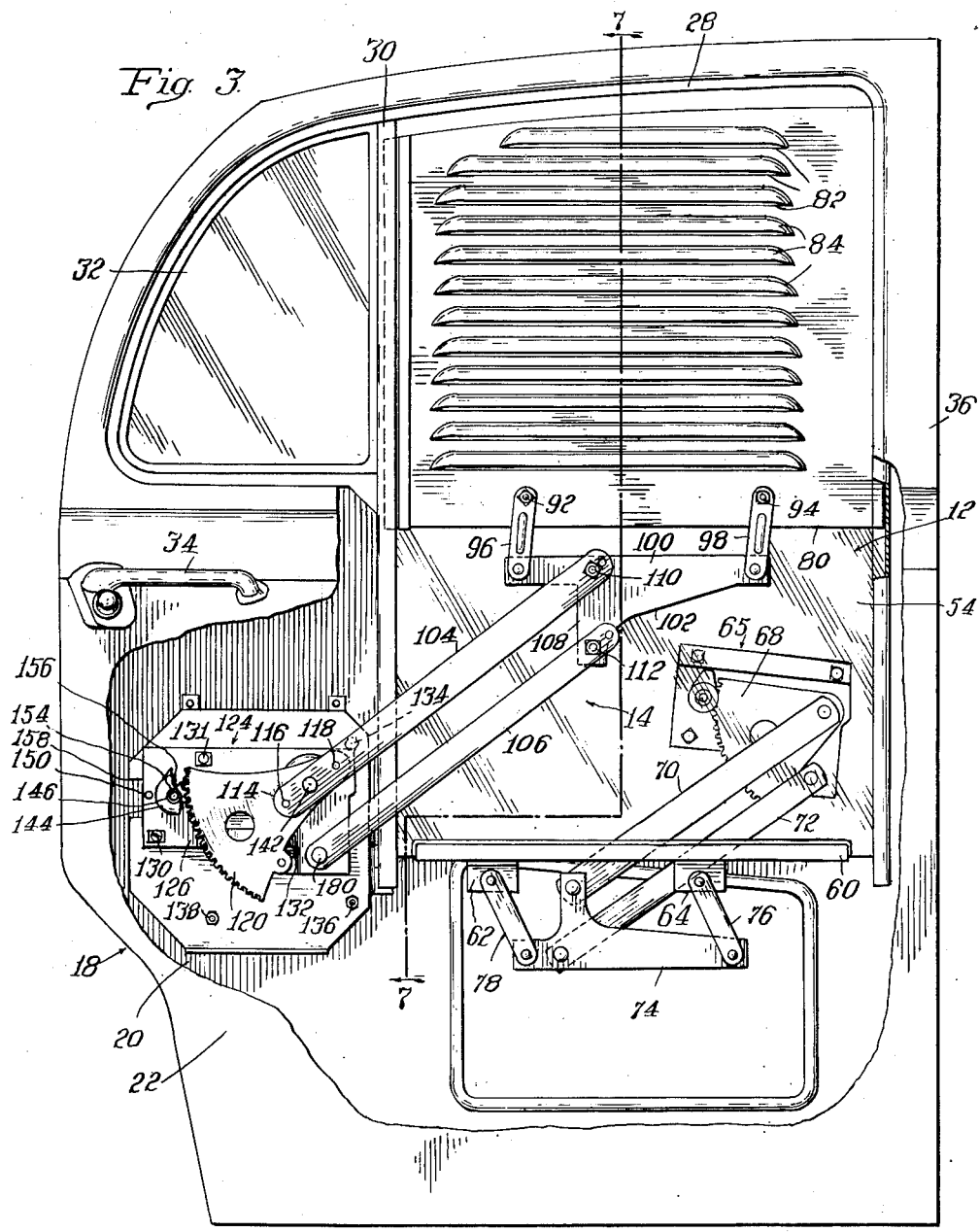

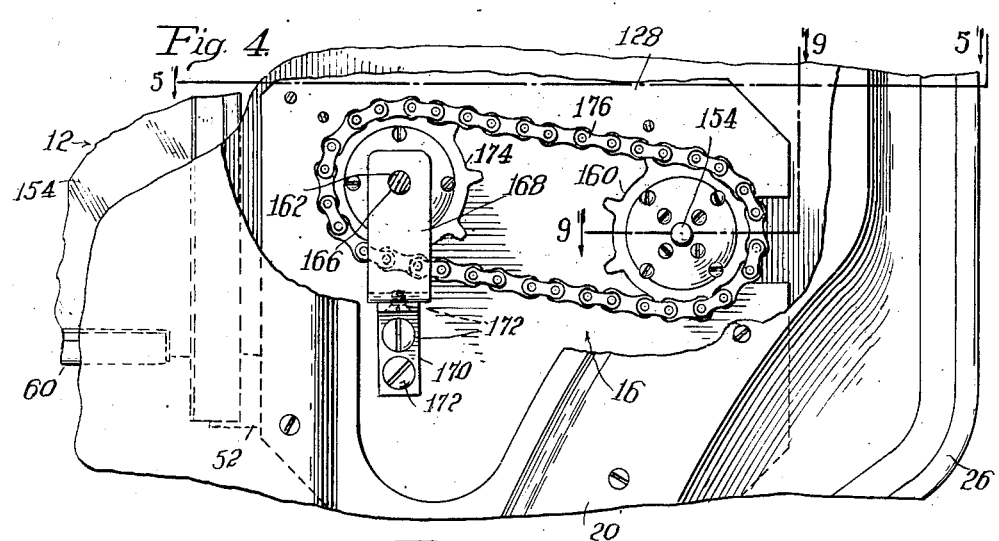
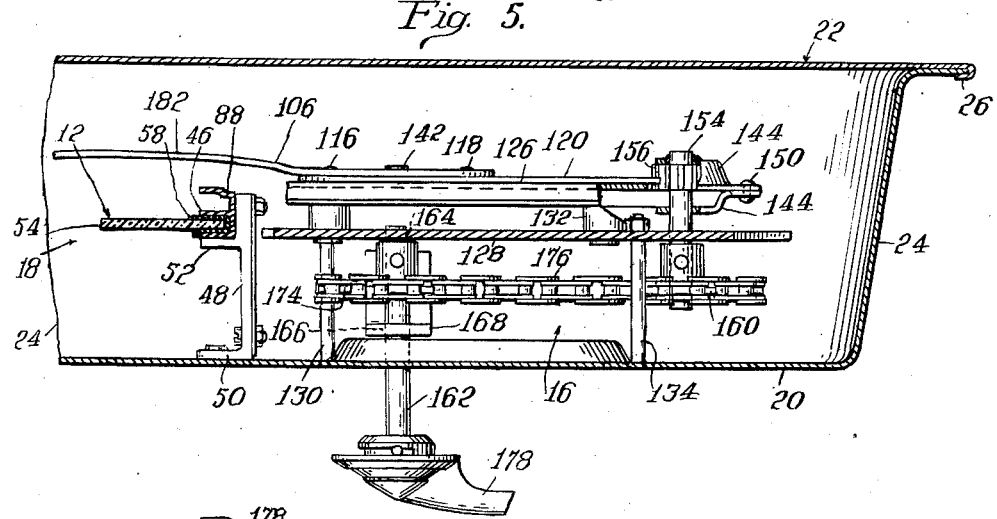
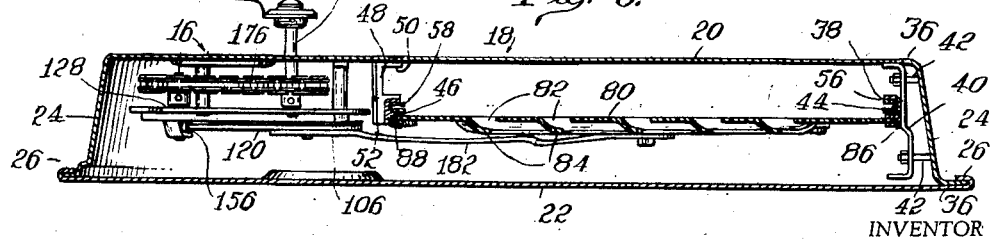

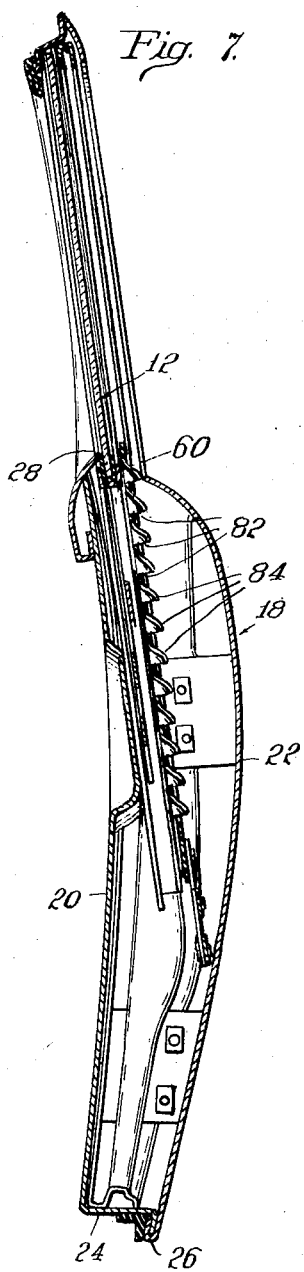
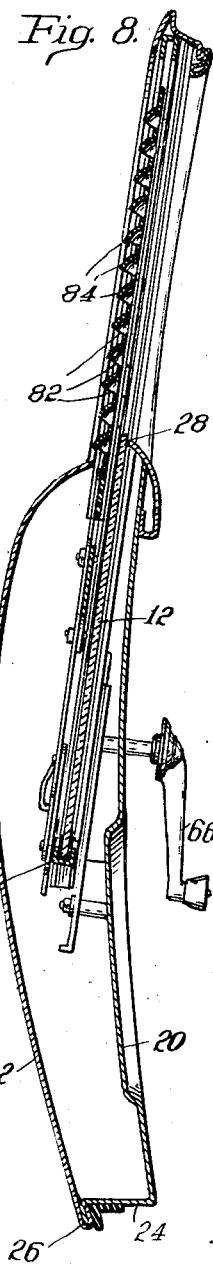
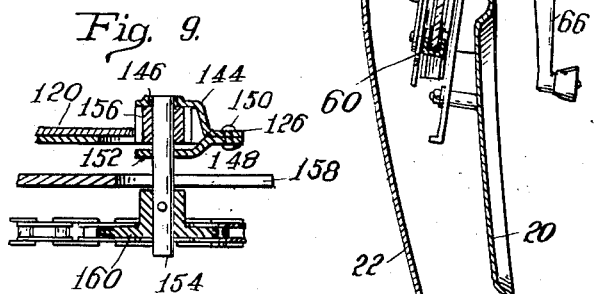
INVENTOR
*Bernard E. Thaxton*
BY
ATTORNEYS

2,780,458

LOUVERED WINDOW AND OPERATING MEANS
THEREFOR FOR VEHICLE DOORS

Bernard E. Thaxton, Washington, D. C.

Application March 24, 1953, Serial No. 344,266

7 Claims. (Cl. 268—126)

The present invention relates to improvements in vehicle door and window construction and more particularly relates to an opaque or transparent louvered window and operating means therefor which is supplementary to the usual window and operator assembly of the door whereby during hot weather, a vehicle can be parked and only the opaque louvered window raised so as to provide for ventilation of the vehicle when parked and locked. Of course, if state laws require, the louvered window is contemplated as being transparent with the added advantage that during hot inclement weather, the transparent louvered window may be raised so as to permit ventilation while excluding rain, yet giving the driver of the vehicle the necessary visibility.

In vehicle door and window constructions, there are usually provided inner and outer panels which are joined together so as to define a space therebetween in which operating means for raising and lowering the window and other means for connecting the door-opening handles with the latch means of the door, etc. are disposed. For the usual means employed, there is ample space in conventional vehicle doors. However, when it is desired to include additional mechanism such as contemplated herein in the form of a louvered panel and operating mechanism therefor, a problem is encountered as to the disposition of the component elements without loss in operating efficiency.

Accordingly, it is an object of the present invention to provide a louvered window panel in a vehicle door and to overcome the problem existent as to the disposition of operating mechanism therefor without sacrificing simplicity in the arrangement or overall operating efficiency.

Another object of the present invention is to provide an arrangement of louvered window panel and operating means therefor which will offer no interference to the means for raising and lowering the conventional window of the vehicle door.

A further object of the present invention is to provide an arrangement of louvered window panel and operating means therefor which will require a minimum of alteration especially insofar as the vehicle door construction is concerned.

Various other objects are to provide an arrangement which will be economical from a manufacturing standpoint and which will be facile of assembly in the door so as not to materially increase the cost of the door to which it is applied.

Other objects and advantages will become apparent from the description to follow.

In fulfilling the foregoing objects, I provide, generally speaking, a pair of double channel members carried by at least one of the pair of panels which constitute the door, the panels having an opening therethrough defining the window opening. The channel members are located at the sides of the window opening and the usual glass window is guidingly engaged between a pair of the guide channels. Operating means for and connected with the glass window is disposed out of the plane of the glass window. I further provide a louvered, opaque or transparent window which is engaged between the other pair of channels of the channel members. Linkage means is connected with a bottom edge portion of the louvered window and additional operating means is carried between the panels of the door and is connected with the linkage means for raising and lowering the louvered window. The latter means is located to one side of the operating means for the glass window and beneath the ventilator window of the door in those doors provided with ventilator windows.

The best form in which I have contemplated applying my invention is clearly illustrated in the accompanying drawings wherein:

Fig. 1 is a perspective view of an automobile showing the louvered window construction of the present invention embodied therein;

Fig. 2 is an elevational view of one of the doors of the vehicle, part being broken away to show the operating mechanism for the louvered window in its "down" position;

Fig. 3 is an elevational view of a door, part being broken away and showing the operating mechanism for the louvered window in its "up" position;

Fig. 4 is an enlarged detail view as seen from the inside of the door showing the sprocket arrangement for effecting raising and lowering of the louvered window;

Fig. 5 is a horizontal sectional view taken substantially along the plane of line 5—5 of Fig. 4;

Fig. 6 is a longitudinal sectional view taken substantially along the plane of line 6—6 of Fig. 2;

Fig. 7 is a vertical sectional view taken substantially along the plane of line 7—7 of Fig. 2;

Fig. 8 is a vertical sectional view taken substantially along the plane of line 8—8 of Fig. 3;

Fig. 9 is a detail sectional view taken substantially along the plane of line 9—9 of Fig. 4.

Having reference more particularly to the drawings, it will be seen in Fig. 1 that an automobile 10 is shown equipped with louvered window constructions 12 in all four doors of the vehicle in accordance with the present invention. The means for raising and lowering the louvered window construction 12 includes the linkage means 14 as seen best in Figs. 2 and 3, and the operating means 16, as seen best in Figs. 4, 5 and 6.

The details of the door construction 18, in which the louvered window and means for raising and lowering the same are incorporated, are best seen in Figs. 3-8. The door construction 18 is substantially conventional and includes inner and outer panels 20 and 22, respectively, joined by the peripherally extending flange 24 of the inner panel 22 at the seam 26. The inner and outer panels have aligned openings therethrough which constitute the window opening 28 of the door. In the door as shown, part of the window is partitioned off as at 30 so as to separate the pivotally mounted ventilator window 32. The door is, of course, provided with a handle 34 and suitable operating mechanism (not shown) for latching and unlatching the door, and hinges (not shown) for supporting the door on the vehicle.

Adjacent one side 36 of the door, and between the panels, a double channel member 38 is provided, at least one supporting channel element 40 fixed to the panel 20 by a plurality of nuts on bolts 42, fixing the relation between the double channel member and the door construction. The double channel member is W-shaped and is lined with the usual rubberized liner material 44 or any other suitable material. A similarly lined double channel member 46 located opposite to the above described channel member is positioned so as to be aligned with the partition at 30 and is secured thereto. The lower end of the channel member 46 is fixedly carried by the bracket element 48, Figs. 5 and 6, which in turn is fixed to the inner panel 20 in any suitable manner at 50. The element 48 is substantially L-shaped and has a perpendicularly extending portion 52 so as to provide a pair of perpendicularly related wall portions against which the double channel member 46 is abutted and secured.

The conventional window 54 is slidably carried in the inner channels 56 and 58 of the double channel members 38 and 46. The window is conventionally provided at its lower edge with a carrier bar 60 having a pair of ears 62 and 64 carried thereby. The operating means 65 (Fig. 3) for raising and lowering the window includes the handle 66 suitably interconnected with the segmental gear 68 so that upon rotation of the segmental gear 68 the connecting bars 70 and 72, through the bracket 74 and links 76 and 78, pivot to raise and lower the window 54. The operating means 65, for the most part is located between the window 54 and the inner panel 20.

In accordance with the present invention, I provide a louvered window construction 12 which is comprised of a panel 80 of a suitable transparent plastic provided with substantially horizontally extending openings 82 therethrough having outwardly extending protective overhanging panel portions 84. The louvered window 12 is slidably received in the outer channels 86 and 88 of the double channel members 38 and 46. A bottom area 90 of the louvered window is imperforate except for a pair of pivot openings through which the bolts 92 and 94 extend for pivotally attaching the linkage means thereto.

The linkage means includes the links 96 and 98 which are pivoted to the bolts 92 and 94 on the panel 80. The free ends of the links 96 and 98 are interconnected by the cross-bar portion 100 of the T-shaped bracket 102 whereby the links are in substantial parallelism. A pair of parallel bars 104 and 106 are pivotally connected to the end portions of the stem 108 of the T-shaped bracket by the bolts 110 and 112. The free end 114 of the bar 104 has fixedly secured thereto by the rivets 116 and 118 or the like a sector gear 120.

The operating means 124 for raising and lowering the louvered window 12 includes a pair of plates 126 and 128 connected together in fixed relation by the several bolt and nut connecting means 130, 131, 132 and 133. The plate 128 in turn is fixed to the panel 20 by the bolts at 134, 136 and 138. The segmental gear and the parallel bar attached thereto are pivoted to the plate 126 by the pin at 142. The plate 126 has an offset 144 formed therein, as seen best in Fig. 9, providing a bearing at 146. A complementary plate element 148 is secured to the plate 126 by rivet 150 so as to provide a bearing at 152. A shaft 154 having a pinion 156 thereon is rotatably carried by the pair of bearings 146 and 152 and extends through the other plate 128 at the cut-away portion 158, so that the pinion is in operative engagement with the segmental gear 120.

The shaft 154 has a sprocket 160 carried thereby between the plate 128 and the inner panel 20 of the door. Another shaft 162 is journaled at 164 in the plate 128 and at 166 in the bracket 168. The bracket 168, as shown best in Fig. 4, is secured to the plate 128 by the angle iron 170 and screws 172. A sprocket 174 is fixed to the shaft 162 between the plate 128 and inner panel 20 and a chain 176 connects the two sprockets 160 and 174. An operating handle 178 is fixed to the shaft 162 inwardly of the inner panel 20. The operating means is for the most part disposed between the inner and outer panels 20 and 22 at the space between the double channel member 46 and the adjacent flange wall portion 24 as seen best in Figs. 5 and 6. In order to operatively interconnect the operating means with the louvered window to raise and lower the same, the parallel bar 106 is pivoted to the plate 126 at the pin 180, and both parallel bars are bowed as at 182 so as to obviate interference between the bars 104 and 106 and the adjacent double channel member 46, link 96 and the overlapping louvered window portion.

The particular location of the operating means and the linkage means connecting the operating means with the louvered window is such that a minimum resistance is encountered and maximum efficiency results. While the invention as discussed utilizes a manually operated crank 178 for the louvered window, it is to be understood that a push-button electric motor can be employed as an operating means for raising and lowering the louvered window. Of course, the present invention is applicable to either two-door or four-door models and also to convertibles and hard-top models. In any of these models, each door will be provided with a louvered window construction as hereinbefore described.

Although my description has been primarily with regard to the louvered window panel as constructed from a transparent plastic, the panel can, of course, be constructed from metal so as to be useful for closing a locked vehicle yet permitting ventilation of the vehicle, as during hot weather. Of course, the usual glass windows are lowered when the louvered window is raised to permit ventilation.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. In a door construction including spaced inner and outer panels secured together and having an opening therethrough defining a window opening and vertical guides at opposite sides of the window opening and a window slidable in the guides; mechanism for moving the window in said guides comprising a pair of plates fixed together in spaced relation, means securing said pair of plates between said panels in substantially parallel relation therewith below and to one side of the window opening, said plate adjacent to the outer panel having an opening remote from the guides and an offset portion overlying the opening on the side opposite from the other plate, said offset portion carrying a bearing, a stub shaft having one end in said bearing and extending through and rotatably supported by said other plate, a second shaft having an end rotatably supported by said second plate and extending through the inner panel, a pinion gear carried by the stub shaft on the inner side of said offset, sprocket gears carried by the shafts between the said other plate and the inner panel, a sector gear disposed against the side of the first plate nearest the outer panel and having toothed connection with the pinion gear, means pivotally mounting the sector gear on said first plate for turning on an axis adjacent to and paralleling the second shaft, a pair of parallel bars, one of said bars having an end fixed to the sector gear and the other bar having an end pivotally secured to said one plate to turn on an axis paralleling the turning axis of the sector gear, means for turning the second shaft, and means for operatively coupling the other ends of the bars with a window supported in said guides.

2. The invention according to claim 1, with an angle member secured to said other plate below the second shaft, and a bearing bracket mounted on the angle member and carrying a bearing adjacent to the inner panel, the second shaft being rotatably supported in the last named bearing.

3. The invention according to claim 1, with a complementary plate secured to the first plate to overly the opening therein on the side thereof remote from the offset portion, and a bearing carried by the complementary plate having the stub shaft passing therethrough, said pinion being located between the offset portion and the complementary plate.

4. In an automobile door construction including spaced inner and outer panels secured together and having an opening therethrough defining a window opening, horizontally spaced mounting brackets carried by at least one of said panels, a pair of unitary double channel members carried vertically by said brackets at opposite sides of the window opening approximately centrally between the panels to provide two pairs of guide channels, a first window unit in one pair of channels, a second window unit slidably engaged in and between the other pair of channels for guided up and down movement, means between the first window unit and the inner panel for raising and lowering the first unit, linkage means connected with a bottom edge portion of said second window unit, and operating means carried between said panels below and offset to one side of the window opening and connected with said linkage means for raising and lowering the second window unit upon operation thereof, said linkage means including a pair of short substantially parallel links pivotally connected at spaced points on the bottom edge portion of and depending from the second window unit, a substantially T-shaped plate having the lower ends of said substantially parallel links pivotally connected to end portions of the cross bar of the T-shaped plate, parallel actuating bars for the second window unit pivotally connected to end portions of the stem of the T-shaped plate and extending laterally toward said operating means, said parallel bars being formed to facilitate locating the said laterally directed ends substantially in the plane of the second window unit and said ends being pivoted to turn about axes fixed relative to the door panels, and a sector gear fixed to the said laterally directed end portion of one of said parallel bars on the side of the fixed pivot axes remote from the pivotal connection with the T-shaped plate, said sector gear being operatively engaged with said operating means for effecting pivoting of the parallel bar to which it is fixed.

5. In an automobile door construction including spaced inner and outer panels secured together and having an opening therethrough defining a window opening, horizontally spaced mounting brackets carried by at least one of said panels, a pair of unitary double channel members carried vertically by said brackets at opposite sides of the window opening approximately centrally between the panels to provide two pairs of guide channels, a first window unit in one pair of channels, a second window unit slidably engaged in and between the other pair of channels for guided up and down movement, means between the first window unit and the inner panel for raising and lowering the first unit, linkage means connected with a bottom edge portion of said second window unit, and operating means carried between said panels below and offset to one side of the window opening and connected with said linkage means for raising and lowering the second window unit upon operation thereof, said linkage means including a pair of short substantially parallel links pivotally connected at spaced points on the bottom edge portion of and depending from the second window unit, a substantially T-shaped plate having the lower ends of said substantially parallel links pivotally connected to end portions of the cross bar of the T-shaped plate, parallel actuating bars for said second window unit pivotally connected to end portions of the stem of the T-shaped plate and extending laterally toward said operating means, the free ends of said parallel bars being pivoted to turn about axes fixed relative to the door panels, a sector gear fixed to the end portion of one of said parallel bars on the side of the fixed pivot axes remote from the pivotal connection with the T-shaped plate, said sector gear being operatively engaged with said operating means for effecting pivoting of the parallel bar to which it is fixed, said sector gear and operating means being disposed between the panels of the door and with said operating means substantially co-planar with the window units of the door, and said parallel bars being longitudinally bowed so as to parallelly interconnect the operating means with the second window unit without interfering with the raising and lowering of either window unit.

6. In an automobile door construction including spaced inner and outer panels secured together and having an opening therethrough defining a window opening, horizontally spaced mounting brackets carried by at least one of said panels, a pair of unitary double channel members carried vertically by said brackets at opposite sides of the window opening approximately centrally between the panels to provide two pairs of guide channels, a first window unit in one pair of channels, a second window unit slidably engaged in and between the other pair of channels for guided up and down movement, means between the first window unit and the inner panel for raising and lowering the first unit, linkage means connected with a bottom edge portion of said second window unit, and operating means carried between said panels below and offset to one side of the window opening and connected with said linkage means for raising and lowering the second window unit upon operation thereof, said linkage means including a pair of parallel bars extending laterally from the bottom edge of the second window unit toward said operating means, said operating means including a stub shaft, means supporting the latter for rotation on an axis extending across the space between the panels, a second shaft paralleling the stub shaft and supported between the stub shaft and window units and adapted to be rotated from the inner side of the door, sprockets carried by said shafts, a drive chain coupling the sprockets, a sector gear pivotally supported in spaced relation to the inner end of the first shaft and across the latter, a pinion gear carried by the stub shaft and meshing with the sector gear, one of said parallel bars having the end adjacent to the operating means rigidly secured to the sector gear to turn therewith, and a pivot securing the other one of the parallel bars at the end remote from the window units for turning on an axis adjacent to and parallel with the pivot axis of the sector gear.

7. In an automobile door construction including spaced inner and outer panels secured together and having an opening therethrough defining a window opening, horizontally spaced mounting brackets carried by at least one of said panels, a pair of unitary double channel members carried vertically by said brackets at opposite sides of the window opening approximately centrally between the panels to provide two pairs of guide channels, a first window unit in one pair of channels, a second window unit slidably engaged in and between the other pair of channels for guided up and down movement, means between the first window unit and the inner panel for raising and lowering the first unit, linkage means connected with a bottom edge portion of said second window unit, and operating means carried between said panels below and offset to one side of the window opening and connected with said linkage means for raising and lowering the second window unit upon operation thereof, said linkage means including a pair of short parallel links pivotally connected at spaced points on the bottom edge portion of and depending from the second window unit, a substantially T-shaped plate having the lower ends of said parallel links pivotally connected to end portions of the cross bar of the T-shaped plate, parallel bars pivotally connected to end portions of the stem of the T-shaped plate and extending laterally toward said operating means, the free ends of said parallel bars being pivoted to turn about axes fixed relative to the door panels, and a sector gear fixed to the end portion of one of said bars on the side of the fixed pivot axes remote from the pivotal connection with the T-shaped plate, said sector gear being operatively engaged with said operating means for effecting pivoting of the parallel bar to which it is fixed, said operating means including a pair of chain-connected sprockets one of which is adapted to be rotated by a person within the automobile, the other of said sprockets having a stub shaft fixed for rotation therewith and having a pinion fixed to the stub shaft for driving engagement with said sector gear.

References Cited in the file of this patent

UNITED STATES PATENTS

| | | |
|---|---|---|
| 1,739,029 | Hart | Dec. 10, 1929 |
| 1,840,753 | Thrune | Jan. 12, 1932 |
| 1,882,260 | Rolle et al. | Oct. 11, 1932 |
| 1,973,166 | Fowler et al. | Sept. 11, 1934 |
| 1,986,940 | Morrison | Jan. 8, 1935 |
| 2,016,645 | Maddox | Oct. 8, 1935 |
| 2,093,860 | Austin | Sept. 21, 1937 |
| 2,304,640 | Joachim | Dec. 8, 1942 |
| 2,560,976 | Parsons | July 17, 1951 |
| 2,591,232 | Brown | Apr. 1, 1952 |
| 2,628,549 | Stelmach | Feb. 17, 1953 |

FOREIGN PATENTS

| | | |
|---|---|---|
| 462,623 | Great Britain | Mar. 12, 1937 |